(12) United States Patent
Nix et al.

(10) Patent No.: US 6,212,888 B1
(45) Date of Patent: Apr. 10, 2001

(54) QUICK CONNECT COUPLING FOR A HYDRAULIC CONTROL SYSTEM

(75) Inventors: Richard A. Nix, Ortonville; Scott Lee Loring, Lapeer; David C. Peterson, Walled Lake, all of MI (US)

(73) Assignee: Automotive Products (USA), Inc., Auburn Hills, MI (US)

(*) Notice: Subject to any disclaimer, the term of this patent is extended or adjusted under 35 U.S.C. 154(b) by 0 days.

(21) Appl. No.: 09/073,839

(22) Filed: May 7, 1998

(51) Int. Cl.[7] .......................................... F15B 7/10
(52) U.S. Cl. ................................. 60/584; 60/592
(58) Field of Search ................. 60/584, 592; 91/432, 91/468; 138/30, 31; 251/215

(56) References Cited

U.S. PATENT DOCUMENTS

| | | |
|---|---|---|
| 4,240,466 | 12/1980 | Herzan et al. . |
| 4,454,632 | 6/1984 | Nix et al. . |
| 4,585,106 | 4/1986 | Shirley . |
| 4,609,087 | 9/1986 | Shirley . |
| 4,687,084 | 8/1987 | Leigh-Monstevens et al. . |
| 4,869,292 | * 9/1989 | Sulwer .......................... 137/614.17 |
| 4,915,202 | 4/1990 | Leigh-Monstevens et al. . |
| 4,936,345 | * 6/1990 | Nix .............................. 137/614.03 |
| 4,949,827 | 8/1990 | Leigh-Monstevens et al. . |
| 5,083,433 | 1/1992 | Leigh-Monstevens . |
| 5,289,850 | 3/1994 | Sarson et al. ..................... 137/614 |
| 5,293,902 | 3/1994 | Lapierie ........................ 137/614.04 |
| 5,853,071 | * 12/1998 | Robinson ........................... 188/352 |

FOREIGN PATENT DOCUMENTS

| | | |
|---|---|---|
| 4418553 | 11/1995 | (DE) . |
| 19626016 | 1/1997 | (DE) . |
| 2 280 491 | 2/1995 | (GB) . |
| 2 293 423 | 3/1996 | (GB) . |
| 2 329 945 | 4/1999 | (GB) . |

OTHER PUBLICATIONS

Two photocopies showing prior art female connector with integral bleed, manufactured by FTE Gmbh, Germany.

* cited by examiner

Primary Examiner—Edward K. Look
Assistant Examiner—Thomas E. Lazo
(74) Attorney, Agent, or Firm—Young & Basile, P.C.

(57) ABSTRACT

A hydraulic control apparatus having a master cylinder, a slave cylinder, and a conduit connecting the master cylinder to the slave cylinder is constituted as separate modular units interconnected by a quick connect coupling including a female coupler member and a male coupler member. In addition to providing part of the quick connect coupling between the modular units the female coupler member is provided with a bleed system to facilitate removal and addition of hydraulic fluid to the system as required in relation to initial manufacturer and installation and in relation to field maintenance.

5 Claims, 2 Drawing Sheets

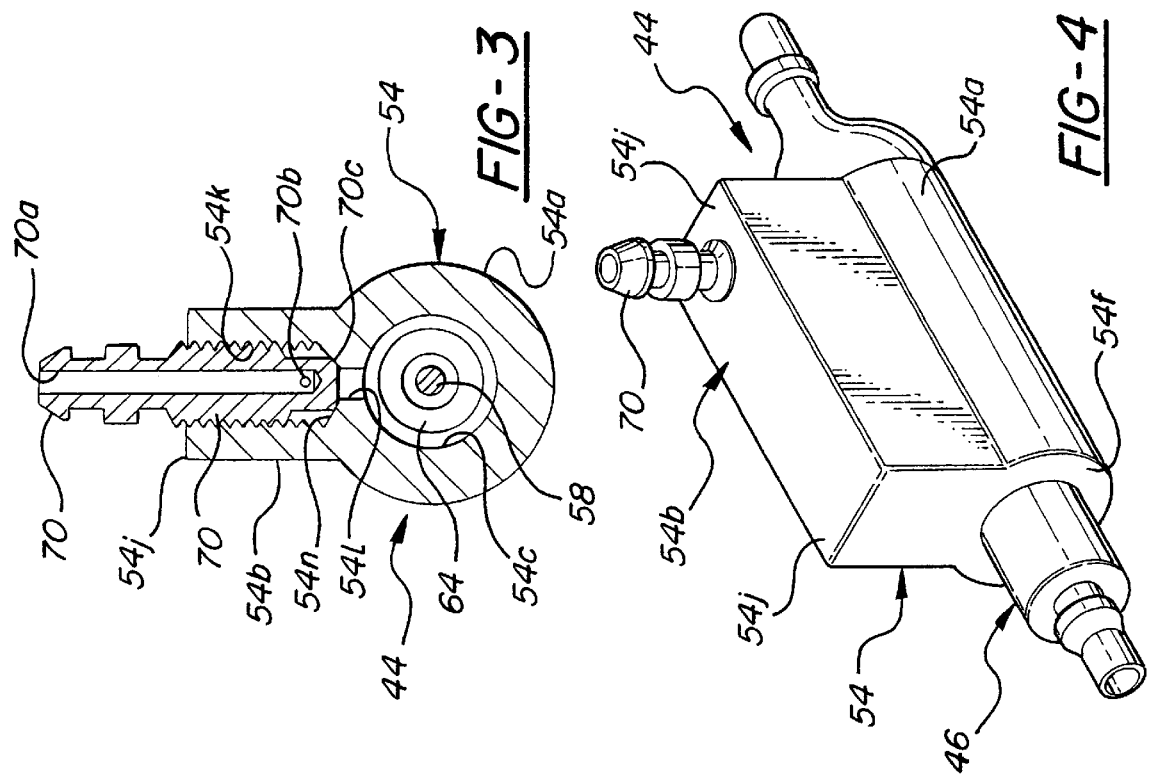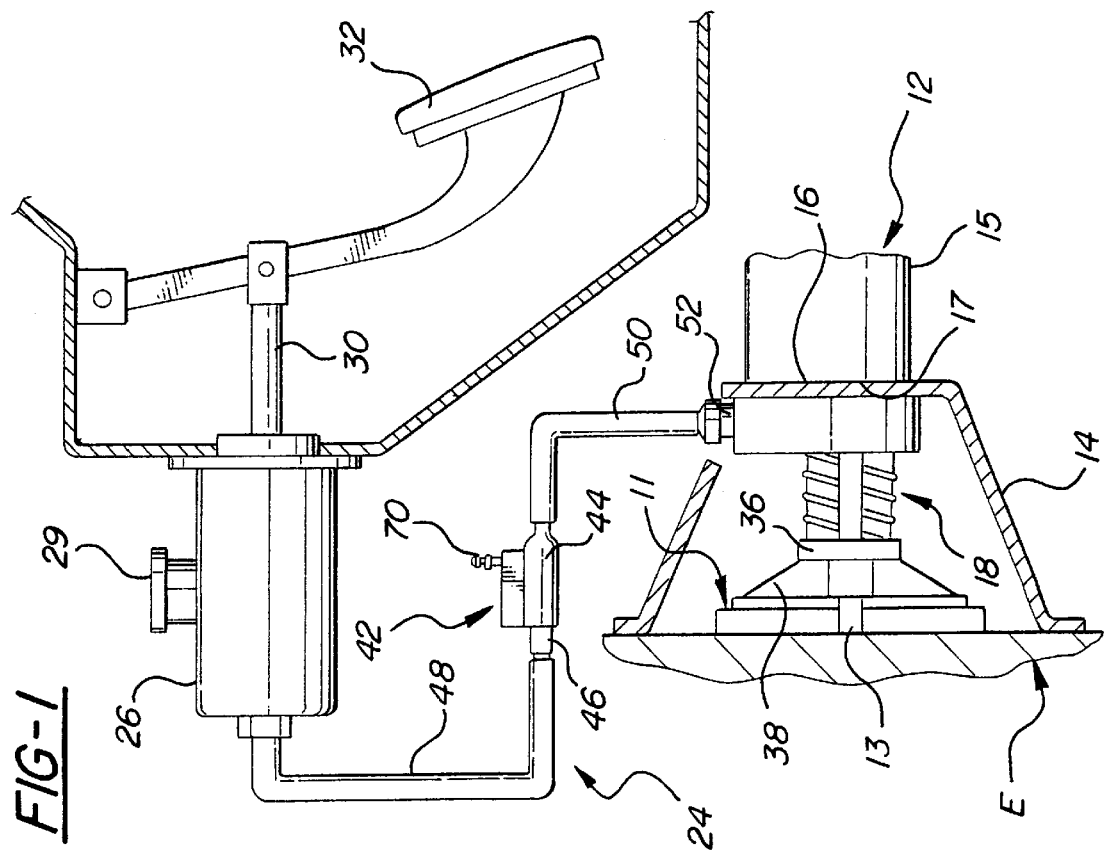

QUICK CONNECT COUPLING FOR A HYDRAULIC CONTROL SYSTEM

BACKGROUND OF THE INVENTION

This invention relates to hydraulic control apparatus in general and more specifically to a hydraulic control apparatus comprising a hydraulic master cylinder and a hydraulic slave cylinder for operating a mechanism remotely located from the master cylinder such for example as the clutch of a motor vehicle.

It is known to prefill with hydraulic fluid a motor vehicle clutch control apparatus comprising a master cylinder, a reservoir of hydraulic fluid, and a slave cylinder for operating the throw-out bearing of a mechanical diaphragm spring clutch, as disclosed in British patent number 1,539,879 and in corresponding U.S. Pat. Nos. 4,407,125 and 4,599,860 assigned to the assignee of the present invention. In addition, U.S. Pat. Nos. 4,503,678, 4,516,507, 4,585,106, 4,585,107, 4,585,108 and 4,585,109, all assigned to the assignee of the present invention, also disclose diverse forms of prefilled hydraulic control apparatus for motor vehicle clutches.

Prefilling with hydraulic fluid and pretesting hydraulic apparatus for operating motor vehicle mechanisms such as mechanical clutches present the many advantages for the motor vehicle manufacturer of receiving a fully assembled mechanism comprising all of the components filled with hydraulic fluid and pretested for proper operation ready to install on a motor vehicle on the assembly line without requiring that the components be installed, separately connected by way of a rigid or flexible conduits, and filled after installation with hydraulic fluid while being purged of any atmospheric air contained in the apparatus.

To simplify the installation of a hydraulic control apparatus in a motor vehicle, and particularly in situations where the apparatus employs a concentric slave cylinder as the clutch actuating device, it is known to provide the control apparatus with a one way quick connect coupling or connector either at some point along the flexible conduit connecting the master cylinder to the slave cylinder or at the end of the conduit connected to the master cylinder or at the end of the conduit connected to the slave cylinder. The one-way quick connect coupling is arranged such that after the hydraulic control apparatus has been assembled, prefilled with hydraulic fluid, and pretested, the connection between the master cylinder and slave cylinder may be broken without loss of fluid, or negligible loss of fluid. The apparatus may thus be shipped to the motor vehicle manufacturer completely filled with hydraulic fluid but in two separate modules such that the concentric slave cylinder may be made a part of the clutch bell housing, or of the transmission casing. This allows the slave cylinder clutch bell housing assembly, or the slave cylinder transmission casing assembly, to be installed in the motor vehicle at whatever station on the assembly line that the clutch or transmission is installed and the master cylinder may be installed in the motor vehicle also at whatever appropriate station and the two cylinders connected together without any loss or negligible loss of fluid and without introduction of air into the apparatus. Whereas module systems of this type have proven to be generally satisfactory, there is still a need to provide a bleed system in the apparatus to facilitate initial filling of the apparatus and/or to facilitate field maintenance and, specifically, field maintenance where it is necessary to bleed the system and refill the system. Whereas the prior art control apparatus have typically included a bleed system in the apparatus, for example in association with the slave cylinder, the prior art bleed systems have complicated the structure of the apparatus and have added to the cost of the apparatus.

SUMMARY OF THE INVENTION

This invention is directed to the provision of improved hydraulic control apparatus for a motor vehicle clutch.

More specifically, this invention is directed to the provision of a hydraulic clutch control apparatus of the modular type incorporating a simplified and improved arrangement for bleeding and filling the system.

The hydraulic control system of the invention is of the type including a master cylinder having an outlet, a slave cylinder having an inlet; a bleed system to facilitate bleeding and filling of the control system; and a conduit assembly interconnecting the outlet of the master cylinder and the inlet of the slave cylinder and including a quick connect coupling including a male coupler member and a female coupler member. Each of the coupler members defines a hydraulic fluid passage and each includes a valve mechanism positioned in the respective fluid passage, means normally maintaining the respective valve mechanism in a closed position closing the respective passage, and means operative in response to coupling of the male and female members to move the valve mechanism to an open position allowing passage of hydraulic fluid through the conduit assembly from the master cylinder outlet to the slave cylinder inlet.

According to the invention, the bleed system includes means defining a bleed passage in one of the quick connect coupler members communicating at one end thereof with the hydraulic fluid passage in the coupler member and at its other end with atmosphere. This arrangement incorporates the bleed system into one of the coupler members of the quick connect coupler to simplify and reduce the cost of the hydraulic control system while yet retaining an effective bleed system for the system.

According to a further feature of the invention, the fluid passage in each coupler member extends through the respective coupler member from the passage inlet to a passage outlet; the conduit assembly includes conduit means extending from the outlet of the master cylinder to the inlet of the fluid passage in the first coupler member and further conduit means extending from the outlet of the fluid passage in the second coupler member to the input of the slave cylinder; the valve mechanism in the first coupler member is positioned in the respective fluid passage adjacent the passage outlet; the valve mechanism in the second coupling member is positioned in the respective fluid passage adjacent the passage inlet; and the bleed passage opens in the respective fluid passage at a location between the inlet and outlet of the fluid passage. This specific inter-relationship between the inlet and the outlet of the fluid passage and the bleed passage contributes importantly to the efficient operation of the bleed system.

According to a further feature of the invention, the means defining the bleed passage includes a threaded bleed bore in the coupler member and a bleed screw threadably positioned in the threaded bore and moveable in an unscrewing manner from a closed position closing the bleed passage to an open position opening the bleed passage. This specific bleed system construction facilitates the ready and efficient operation of the bleed system to facilitate bleeding and refilling of the system.

In the disclosed embodiment of the invention, the bleed system is provided in the female coupler member, although the invention envisions that the bleed system could also be provided in the male coupler member.

BRIEF DESCRIPTION OF THE DRAWINGS

FIG. 1 is a schematic view of a motor vehicle hydraulic clutch control apparatus according to the invention;

FIG. 3 is a cross-sectional view taken on line 3—3 of FIG. 2; and

FIG. 4 is a perspective view of the quick connect coupling of FIG. 2.

DETAILED DESCRIPTION OF THE PREFERRED EMBODIMENT

Figure 2:
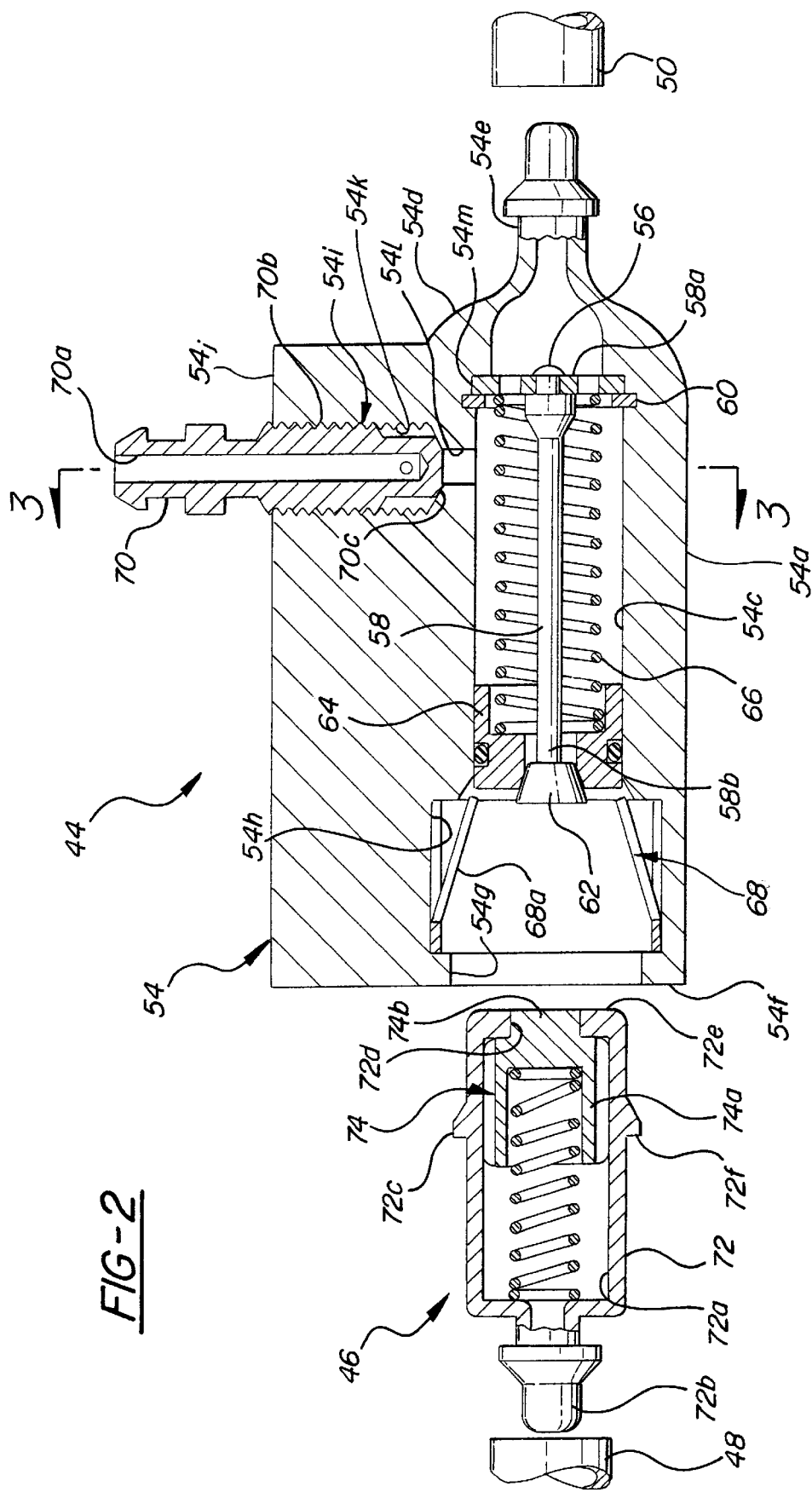
FIG. 2 is a detail cross-sectional view of a quick connect coupling utilized in the invention control apparatus.

The quick connect coupling of the invention is intended for use in association with a hydraulic clutch actuator for a motor vehicle. With reference to FIG. 1, the motor vehicle transmission is schematically illustrated as comprising a friction clutch assembly 11 and a gear box 12 enclosed in a casing or housing 15. A drive shaft 13 drives the gear box 12 from the clutch assembly 11. A bell housing 14 surrounding the clutch assembly 11 is bolted on the rear face of the motor vehicle engine E, and the rear face 16 of the bell housing 14 is bolted to the front face 17 of the gear box casing 15. An annular concentric hydraulic slave cylinder 18 is disposed around the drive shaft 13 within the bell housing 14.

Slave cylinder 18 is connected via a conduit assembly 24 to a master cylinder 26. Master cylinder 26 is provided with an integral hydraulic fluid reservoir 29 and includes an input rod 30 pivotally connected to an end of a clutch control pedal 32 installed within the drivers compartment of the motor vehicle. Rod 30 is connected in known manner to a piston disposed in the master cylinder 26 that operates to displace hydraulic fluid through conduit assembly 24 to the slave cylinder 18 when the clutch pedal is depressed.

Slave cylinder 18 is adapted in known manner to displace a throw-out bearing 36 engaged with the end of clutch release fingers 38 so that clutch 11 is released when hydraulic fluid is introduced into the slave cylinder 18 from the master cylinder 26 through the conduit assembly 24.

Conduit assembly 24 includes a quick connect coupling assembly 42 including a female coupler member 44 and a male coupler member 46; a conduit 48 interconnecting the outlet of the master cylinder 26 and the inlet of male coupler member 46; and a conduit 50 interconnecting the outlet of female coupler member 44 and a connector fitting 52 at the hydraulic inlet of the slave cylinder.

Female coupler member 44 (FIGS. 2, 3 and 4) includes a body 54; a disc 56; a valve stem 58; a retainer ring 60; a valve head 62; a valve sleeve 64; a spring 66; a retainer clip 68; and a bleed screw 70.

Body 54 may be formed, for example, as a casting or forging and may be formed of an aluminum material. Body 54 includes a main body generally cylindrical portion 54a and a block portion 54b extending radially from main body cylindrical portion 54a. A central axial hydraulic fluid passage 54c is defined in main body portion 54a and the outlet end 54d of the main body portion 54a is suitably formed to provide a fitting 54e for suitable connection to conduit 50. The inlet end 54f of main body portion 54a is provided with a circular opening 54g sized to pass male coupler member 46 and further defines a circular spring seat 54h sized to seat retainer clip 68 and having a diameter greater than opening 54g and passage 54c. Body 54 further defines a bleed passage 54i communicating at its inboard end with central passage 54c and opening at its outboard end in the outer face 54j of block portion 54b. Passage 54i includes a threaded outboard portion 54k opening in face 54j and a reduced diameter port portion 54l communicating with the inboard end of portion 54k and opening in central bore 54c.

Disc 56 has a perforated circular configuration and is fixedly positioned against a shoulder 54m formed at the outlet end of the main body portion 54a, by a retainer ring 60.

Valve stem 58 is fixedly secured at one end 58a to disc 56 and extends axially and centrally within fluid passage 54c.

Valve head 62 is fixedly secured to the upstream free end 58b of stem 58 for coaction with valve sleeve 64, which is slidably and sealingly received in bore 54c and biased into a closed position with respect to valve head 62 by coil spring 66.

Retainer clip 68 is positioned in seat 54h and includes a plurality of circumferentially spaced spring fingers 68a for locking coaction with the male coupler member. Retainer clip 68 may, for example, be of the type disclosed in U.S. Pat. No. 4,936,345 assigned to the assignee of the present invention.

Bleed screw 70 is threadably received in threaded bore 54k and includes a central bleed passage 70a communicating with port 54l via a bleed screw port 70b in a reduced diameter inboard end of the screw when the bleed screw is unscrewed to lift the conical seat 70c of the screw off of the conical seat 54n defined by the body 54 at the juncture of threaded bore 54k and port 54l.

Male coupler member 46 includes a body 72, a valve member 74, and a spring 76. Body 72 may be formed of an aluminum material in a casting or forging operation. Body 72 is cylindrical and defines a central passage 72a, a fitting 72b at the inlet end of the coupler member for coaction with conduit 48, and an external annular ridge 72c for coaction with retainer clip spring fingers 68a in response to insertion of the male coupler member into the female coupler member.

Valve member 74 includes a main body portion 74a slidably received in bore 72a and a nose portion 74b positioned in a circular opening 72d defined within the annulus 72e at the outlet end of the coupler member. Nose portion 74b has a cross-sectional configuration corresponding generally to the cross-sectional configuration of valve head 62.

Spring 76 functions to maintain valve member 74 in a closed position in which the outlet end of passage 72a is closed. Circumferentially spaced axial grooves 74c allow the passage of hydraulic fluid through the male coupling member when valve member 74 is moved to an open position.

It will be understood that, in the assembly of the invention control apparatus, a module comprising the female coupler member 44 (with bleed screw 70 in a closed position) the conduit 50, and the slave cylinder 18 is evacuated and filled with a suitable hydraulic fluid; a separate module comprising the male coupler member 46, the conduit 48 and the master cylinder 26 is evacuated and filled with hydraulic fluid; the modules are delivered as two separate modules to the motor vehicle manufacturer; the master cylinder module is installed in the vehicle at a convenient location on the vehicle assembly line; the slave cylinder module is installed on the vehicle at a convenient location on the vehicle assembly line; and the male coupler member 46 is inserted into the female coupler member 44 to move the valve mechanisms in both the male and female coupler members to an open position and provide fluid communication between central passage 72a and central passage 54c.

Specifically, as the male member is inserted into the female member the annulus 72e of the male member engages valve sleeve 64 and moves the valve sleeve 64 away from valve head 62 to open passage 54c while valve head 62 engages nose 74b of valve member 74 to move the valve member away from the valve seat defined by the coaction of valve member 74 and opening 72d and open up passage 72a via axial grooves 74c so that a continuous fluid passage is now established through the coupled coupler members extending from fitting 72b to fitting 54e. As the male member arrives at its coupled position within the female member, spring fingers 68a engage the annular shoulder 72f defined by ridge 72c to lock the male member in its inserted position and preclude inadvertent withdrawal of the male member from the female member.

The control apparatus now functions normally in response to depression of the clutch pedal to deliver pressurized fluid from the master cylinder to the slave cylinder and actuate the vehicle clutch in known manner. In the event that field maintenance is required, bleed screw 70 may be selectively turned in an unscrewing manner to open a passage through port 54l, port 70b, and passage 70a to the atmosphere to allow hydraulic fluid to be added to the system or removed from the system as required to perform the field maintenance, whereafter the bleed screw is moved in a tightening direction to reseat the bleed screw nose 70c on the seat 54h and return the control apparatus to a sealed, normal operating condition.

The invention will be seen to simplify the construction of the clutch control apparatus by incorporating the bleed function in the female member of the quick connect coupler.

Whereas a preferred embodiment of the invention has been illustrated and described in detail, it will be apparent that various changes may be made in the disclosed embodiment without departing from the scope or spirit of the invention. For example, the invention envisions that the bleed system could alternatively be provided in the male member of the quick connect coupling.

It is claimed:

1. A hydraulic clutch control apparatus for a motor vehicle having a bell housing, a clutch assembly positioned within the bell housing, a gearbox, and a drive shaft extending between the clutch assembly and the gearbox, the control apparatus including:

a master cylinder having an outlet;

an annular slave cylinder adapted to be positioned in the bell housing in concentric surrounding relation to the drive shaft and having an inlet;

a conduit assembly interconnecting the outlet of the master cylinder and the inlet of the slave cylinder and including a quick connect coupling including a male coupler member and a female coupler member each defining a hydraulic fluid passage and each including a valve member positioned in the respective fluid passage, means normally maintaining the respective valve member in a closed position closing the respective passage, and means operative in response to coupling of the male and female coupler members to move the valve mechanisms to an open position allowing the passage of hydraulic fluid through the conduit assembly from the master cylinder outlet to the slave cylinder inlet;

a threaded bore in one of said coupler members communicating at one end thereof with the respective hydraulic fluid passage and at its other end with atmosphere; and a bleed screw threadably positioned in the threaded bore and moveable in a screwing manner from a closed position closing the bleed passage to an open position opening the bleed passage;

each hydraulic fluid passage extending through the respective coupler member from a passage inlet to a passage outlet;

the conduit assembly including conduit means extending from the outlet of the master cylinder to the inlet of the fluid passage in one of the coupler members and further conduit means extending from the outlet of the fluid passage in the other one of the coupler members to the inlet of the slave cylinder;

the valve mechanism in said one coupler member being positioned in the respective fluid passage adjacent the passage outlet;

the valve mechanism in said other coupler member being positioned in the respective fluid passage adjacent the passage inlet; and the bleed passage opening in the respective fluid passage at a location between the inlet and outlet of the respective fluid passage.

2. A hydraulic control apparatus according to claim 1 wherein the threaded bore is provided in the female coupling member.

3. A hydraulic control apparatus according to claim 1 wherein the outlet of the female coupler member passage is connected to the slave cylinder inlet and the inlet of the male coupler member passage is connected to the master cylinder outlet.

4. A hydraulic control apparatus according to claim 3 wherein the bleed passage is defined in the female coupler member.

5. A quick connect coupler member for use in a hydraulic control apparatus including a master cylinder, a slave cylinder, and a conduit assembly interconnecting the master cylinder and the slave cylinder and including a quick connect coupling including the quick connect coupler member, the quick connect coupler member comprising:

a body defining a hydraulic fluid passage extending through the body and having an inlet end and an outlet end;

a valve positioned in the fluid passage proximate one end of the passage;

a fitting at the other end of the passage for connection to one of the cylinders;

means operative to normally maintain the valve in a closed position closing the passage and operative in response to coupling with another quick connect coupler member to allow movement of the valve to an open position clearing the passage for hydraulic fluid flow therethrough;

means defining a bleed passage in the body connected at one thereof with the fluid passage at a location between the inlet end and the outlet end of the fluid passage and at its other end with atmosphere and the means defining the bleed passage including a threaded bleed bore in the body and a bleed screw threadably positioned in the threaded bore and movable in a screwing manner from a closed position closing the bleed passage to an open position opening the bleed passage.

* * * * *